United States Patent
Allalouf et al.

(10) Patent No.: US 8,341,437 B2
(45) Date of Patent: Dec. 25, 2012

(54) MANAGING POWER CONSUMPTION AND PERFORMANCE IN A DATA STORAGE SYSTEM

(75) Inventors: Miriam Allalouf, Haifa (IL); Ronen Kat, Haifa (IL); Kalman Z. Meth, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/494,288

(22) Filed: Jun. 30, 2009

(65) Prior Publication Data

US 2010/0332861 A1   Dec. 30, 2010

(51) Int. Cl.
*G06F 1/00* (2006.01)
(52) U.S. Cl. ...................................................... 713/300
(58) Field of Classification Search .................... 713/300
See application file for complete search history.

(56) References Cited

U.S. PATENT DOCUMENTS

| | | | |
|---|---|---|---|
| 4,103,336 A * | 7/1978 | Gindi et al. | 710/105 |
| 4,146,923 A | 3/1979 | Borkan | |
| 5,452,277 A | 9/1995 | Bajorek et al. | |
| 6,173,378 B1 * | 1/2001 | Rozario et al. | 711/163 |
| 6,751,741 B1 | 6/2004 | Kawahara et al. | |
| 6,810,470 B1 * | 10/2004 | Wiseman et al. | 711/163 |
| 6,859,886 B1 | 2/2005 | Johnson | |
| 6,892,312 B1 | 5/2005 | Johnson | |
| 6,934,865 B2 | 8/2005 | Moritz et al. | |
| 6,957,267 B2 * | 10/2005 | Awasthi | 709/232 |
| 6,977,865 B2 * | 12/2005 | Jeong | 365/233.16 |
| 7,073,082 B2 | 7/2006 | Hsu | |
| 7,134,032 B2 | 11/2006 | Yamada et al. | |
| 7,278,136 B2 | 10/2007 | Moritz et al. | |
| 7,353,406 B2 | 4/2008 | Yagisawa et al. | |
| 7,383,382 B2 | 6/2008 | Powell et al. | |
| 7,707,366 B2 * | 4/2010 | Tagawa | 711/154 |
| 2003/0161284 A1 * | 8/2003 | Chen | 370/331 |
| 2005/0171753 A1 | 8/2005 | Rosing et al. | |
| 2005/0210304 A1 * | 9/2005 | Hartung et al. | 713/320 |

OTHER PUBLICATIONS

Joel Wu and Scott A. Brandt, "Storage Access Support for Soft Real-Time Applications," IEEE Real-Time Technology and Applications Symposium (RTAS 2004), pp. 164-173, Toronto, Canada, May 25-28, 2004.

Mark J. Stanovich, Theodore P. Baker, and An-I Andy Wang. "Throttling On-Disk Schedulers to Meet Soft-Real-Time Requirements". Proceedings of the 14th IEEE Real-Time and Embedded Technology and Applications Symposium (RTAS), pp. 331.

Miriam Allalouf, Yuval Shavitt: Achieving Bursty Traffic Guarantees by Integrating Traffic Engineering and Buffer Management Tools. Networking 2006.

Abdul Aleaf, Senior Technical Marketing Manager, National Semiconductor, "Optimizing power consumption in the mobile multimedia delivery chain".

* cited by examiner

*Primary Examiner* — Mohammed Rehman

(74) *Attorney, Agent, or Firm* — F. Jason Far-hadian; Century IP Group

(57) ABSTRACT

A method for managing power consumption in a data storage system is provided. The method comprises receiving a first input/output (I/O) request identifying an I/O operation to be performed by a storage device; delaying scheduling of the first I/O request to manage amount of power consumed by servicing the first I/O request; and forwarding the first I/O request to a storage controller associated with the storage device. The storage controller schedules the first I/O request using a scheduling mechanism, and the storage device services the first I/O request according to the scheduling mechanism.

16 Claims, 6 Drawing Sheets

MANAGING POWER CONSUMPTION AND PERFORMANCE IN A DATA STORAGE SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The claimed subject matter relates generally to data storage systems and, more particularly, to managing power consumption in a data storage system.

BACKGROUND

Power consumption in a data storage system is typically determined by the amount of power consumed statically by components in the storage system when the storage system is idle and the amount of power consumed dynamically to service input/output (I/O) requests received by the storage system. Servicing an I/O request refers to performing an I/O operation identified in the I/O request.

The amount of power consumed to service I/O requests depends, in part, on seek time. Seek time refers to the time required to move a head component of a disk drive in the storage system for the purpose of reading or writing data. A shorter seek time, generally, implies less movement of the head component, which results in less power consumption.

Existing storage systems use a scheduling mechanism to manage performance of I/O requests. Unfortunately, however, the scheduling mechanism does not take into consideration power consumption in the storage system.

SUMMARY

The present disclosure is directed to systems and corresponding methods that facilitate managing power consumption in a data storage system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for managing power consumption in a data storage system is provided. The method comprises receiving a first input/output (I/O) request identifying an I/O operation to be performed by a storage device; delaying scheduling of the first I/O request to manage amount of power consumed by servicing the first I/O request; and forwarding the first I/O request to a storage controller associated with the storage device. The storage controller schedules the first I/O request using a scheduling mechanism, and the storage device services the first I/O request according to the scheduling mechanism.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the claimed subject matter. The level of detail associated with each of the elements or features should not be construed to qualify the novelty or importance of one feature over the others.

Figure 1:
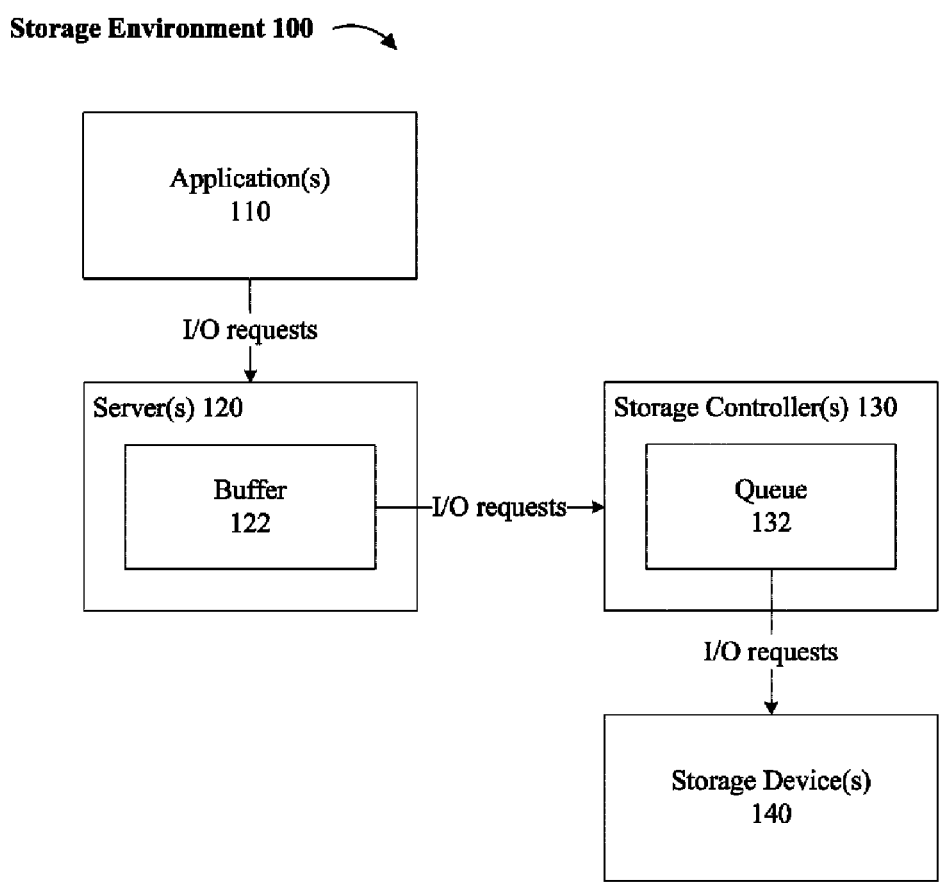
FIG. 1 illustrates an exemplary data storage environment, in accordance with one or more embodiments.

Referring to FIG. 1, in accordance with one embodiment, an exemplary data storage environment 100 comprises one or more applications 110, one or more servers 120, one or more storage controllers 130, and one or more storage devices 140.

In one implementation, an application 110 may be configured to forward an I/O request to a server 120 for processing. The server 120 may be configured to delay scheduling of the I/O request for servicing by holding the I/O request in a buffer 122 until the I/O request is forwarded to the storage controller 130. The rate at which the I/O request is received by the server 120 is referred to the I/O arrival rate. The rate at which the I/O request is received by the storage controller 130 is referred to as the disk arrival rate, in the exemplary embodiment shown in FIG. 1.

It is noteworthy that in other exemplary embodiments, a buffer 122 and a queue 132 may be implemented either internal or external to the server 120, the storage controller 130, the storage device 140, or other systems and devices that execute application 110. Accordingly, FIG. 1 illustrates the flow and buffering of I/O requests between the various components by way of example and shall not be construed as limiting the scope of the claimed subject matter to embodiments in which the buffer 122 is implemented as a component of the server 120.

The storage controller 130 may be configured to service the I/O request by scheduling the I/O request in a queue 132 for servicing by the storage device 140 once a previously scheduled I/O request is serviced. The storage device 140 may comprise a hard disk drive or any other type of storage device that includes a moving head component or other component that whose usage can be optimized at higher utilization.

The rate at which the I/O request is received by the storage device 140 is referred to as the service arrival rate. The service arrival rate may be affected by latency (i.e., the amount of time the I/O request is held in the queue 132 before being serviced by the storage device 140), seek time (i.e., the amount of time to move a head component of the storage device 140 between consecutive I/O operations), and transfer size (i.e., the amount of data requested).

The same service arrival rate may result in different amounts of power being consumed depending on the type of I/O request serviced. For example, servicing an I/O request that is part of a sequential disk access pattern may consume less power than servicing an I/O request that is part of a random disk access pattern since the sequential I/O request has a shorter seek time.

In one implementation, the service arrival rate may be optimized by scheduling or re-scheduling I/O requests in the queue 132 so that seek time is reduced. For example, a storage controller 130 may schedule one or more I/O requests to conform as close as possible to a sequential disk access pattern so that the amount of power consumed to service the I/O request is reduced.

Figure 2:
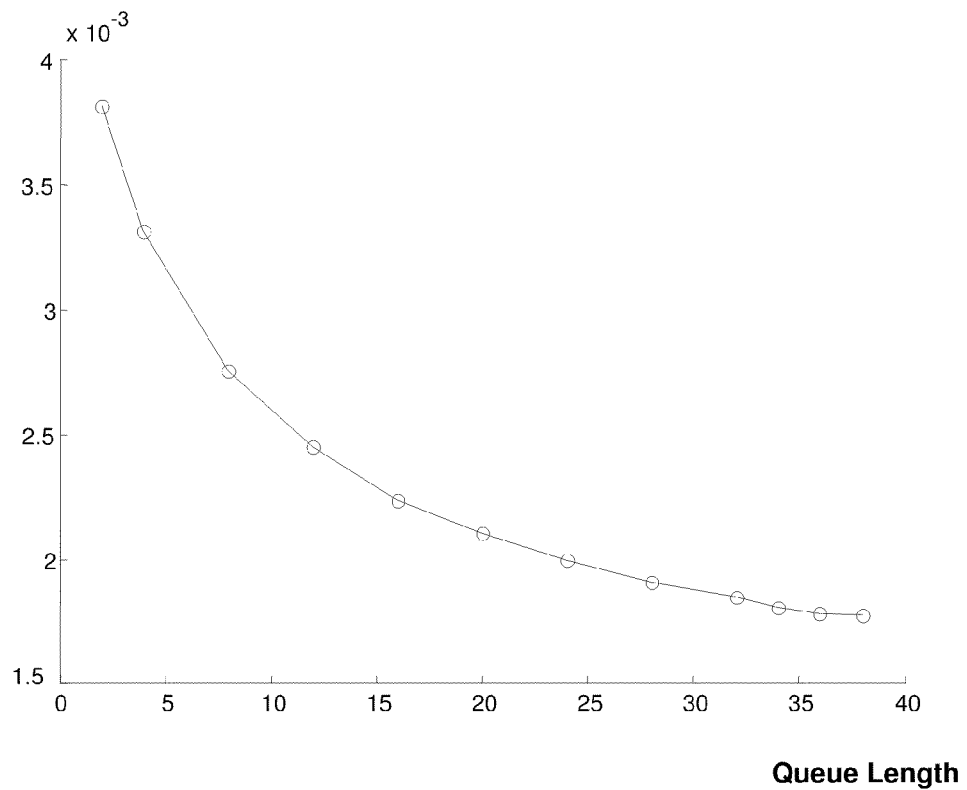
FIG. 2 is a graph illustrating the relationship between power consumption and queue length in a storage system, in accordance with one embodiment.
Figure 3:
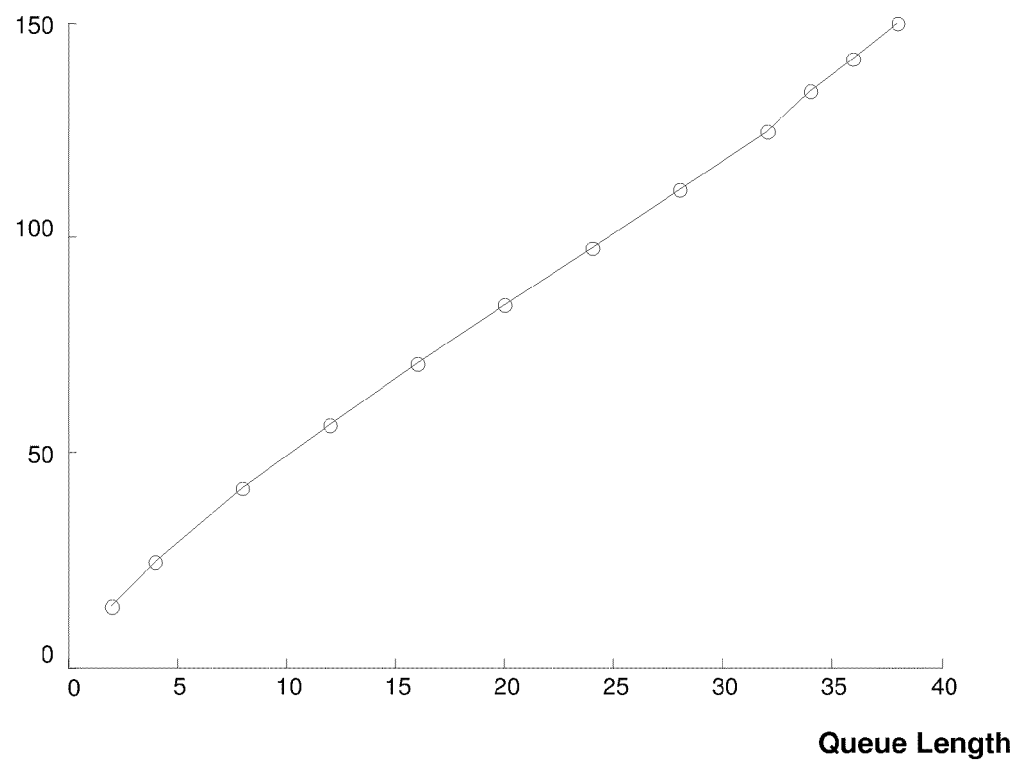
FIG. 3 is a graph illustrating the relationship between response time and queue length in a storage system, in accordance with one embodiment.

On average, the amount of power consumed to service an I/O request decreases as the length of the queue 132 (i.e., the number of scheduled I/O requests) increases, as shown in FIG. 2. However, the response time (e.g., the amount of time to process, schedule, and service an I/O request) increases as the length of the queue 132 increases, as shown in FIG. 3. It is noteworthy that FIGS. 2 and 3 illustrate power consumption and response time, respectively, for a particular storage device, and the numbers may vary for different models of storage devices.

Thus, there is a trade-off, between efficient power consumption and performance (e.g., response time). To balance power consumption and performance, the length of the queue 132 may be managed according to a predefined threshold level of power consumption for an I/O request, and the response time for an I/O request may be managed according to a predefined timeout period, as provided in detail below.

The predefined threshold level of power consumption may be used to determine a target queue length. For example, if the predefined threshold level is $2.2 \times 10^{-3}$ 12V amperes, the target queue length for a particular storage device may be determined to be 20 I/O requests, according to FIG. 2. The predefined timeout period may be used to determine a maximum latency, or the maximum amount of time an I/O request may be held at the buffer 122 without causing a timeout. A timeout may occur if the response time exceeds the predefined timeout period, which may be imposed by the application 110.

Figure 4:
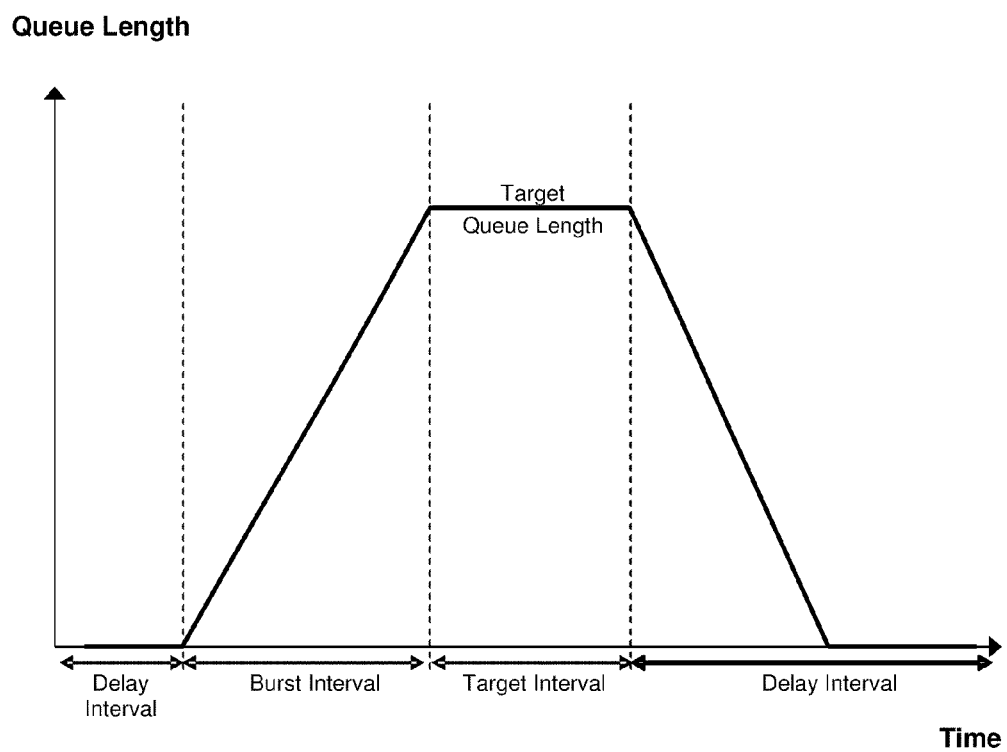
FIG. 4 is a graph illustrating an adaptive transmission protocol, in accordance with one embodiment.
Figure 5:
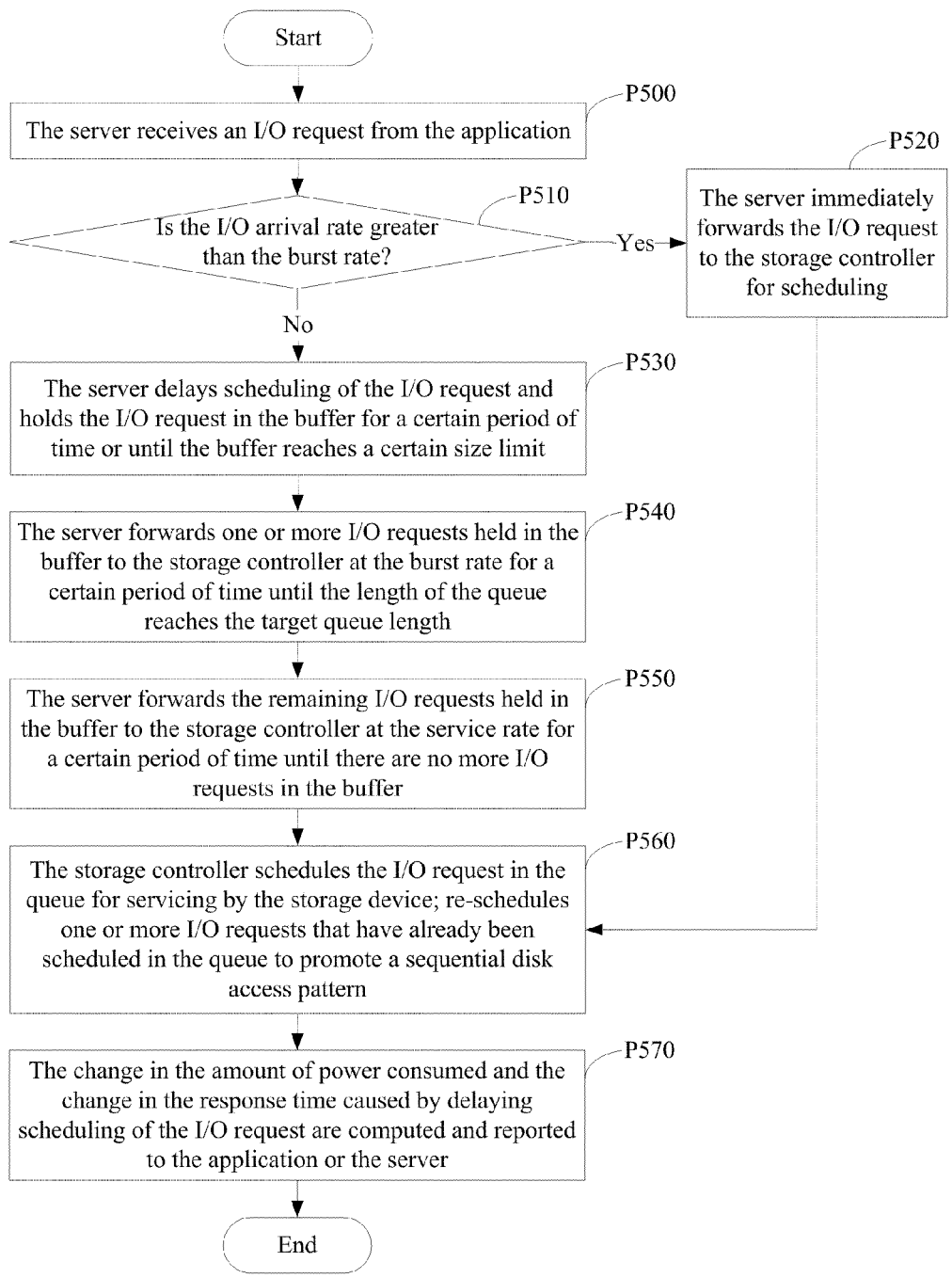
FIG. 5 is a flow diagram of a method for managing power consumption in a storage system, in accordance with one embodiment.

Advantageously, the relationship between power consumption and the number of scheduled I/O requests may be exploited to implement a burst-like transmission protocol that reduces power consumption. Referring to FIGS. 1, 4, and 5, in accordance with one embodiment, the server 120 receives an I/O request from the application 110 and determines whether the I/O arrival rate is greater than a burst rate, which is defined below (P510). If so, the server 120 immediately forwards the I/O request to the storage controller 130 for scheduling (P520).

Otherwise, the server I/O delays scheduling of the I/O request and holds the I/O request in the buffer 122 for a certain period of time (i.e., a delay interval) or until the buffer 122 reaches a certain size limit (e.g., a maximum buffer size) (P530). In one implementation, the maximum latency is used to define an upper limit of the delay interval, and the maximum buffer size is defined as the product of the burst rate and a burst interval, both of which are defined below. During the delay interval, the disk arrival rate is equal to zero because there are no I/O requests being forwarded to the storage controller 130.

Once the delay interval elapses or the buffer 122 reaches the maximum buffer size, one or more I/O requests held in the buffer 122 is forwarded to the storage controller 130 for a certain period of time (i.e., the burst interval) until the length of the queue 132 reaches the target queue length (P540). During the burst interval the disk arrival rate is at its peak and is equal to the burst rate. The burst rate is calculated using the following expression: (the length of the queue 132+(the service arrival rate*the burst interval))/the burst interval. In one implementation, the queue length may be in units of I/O requests in the queue 132, the service arrival rate may be in units of I/O requests per second, and the burst interval may be in units of seconds.

Once the length of the queue 132 reaches the target queue length, the remaining I/O requests in the buffer 122 are forwarded to the storage controller 130 for a certain period of time (i.e., a target interval) until there are no more I/O requests in the buffer 122 (P550). During the target interval, the disk arrival rate is adjusted to be the same as the service arrival rate so that the length of the queue 132 is maintained at the target queue length for as long as possible.

Upon receiving the I/O request, the storage controller 130 schedules the I/O request in the queue 132 for servicing by the storage device 140 and may also re-schedule one or more other I/O requests that are already scheduled in the queue 132 to promote a sequential disk access pattern, as provided earlier (P560). In one embodiment, the change in the amount of power consumed and the change in the response time caused by delaying scheduling of the I/O request may be computed and reported to the application 110 or the server 120 (P570).

Advantageously, the server 120 may manage the amount of power consumed to service the I/O request by adjusting the disk arrival rate according to the length of the queue 132 and the target queue length. Moreover, such management of power consumption avoids application timeouts by adjusting the delay interval according to the allowed maximum latency. It is noteworthy that the storage device 140 may enter a low power mode (e.g., a sleep mode) during the delay interval, if the storage device 140 has several power modes.

Still referring to FIGS. 1, 4, and 5, it is noteworthy that the operations and functions that are discussed with relation to the server 120 and the storage controller 130 (e.g., managing the arrival, transmission, buffering, and scheduling of I/O requests) may be performed by other system components implemented external to the server 120 or the storage controller 132 (e.g., the application 110 or the storage device 140).

In some embodiments, the server 120 may maintain separate buffers and the storage controller 130 may maintain separate queues for read and write requests. In one implementation, read requests are synchronous (i.e., acknowledged as complete upon servicing), and write requests are asynchronous (i.e., acknowledged as complete and serviced at a later time). In another implementation, the server 120 or the storage controller 130 may forward read requests and write requests for scheduling or servicing, respectively, to best fit the response time required to avoid application timeouts. For example, read requests may be forwarded before write requests or vice versa.

In different embodiments, the claimed subject matter may be implemented either entirely in the form of hardware or entirely in the form of software, or a combination of both hardware and software elements. For example, the applications 110, the servers 120, the storage controllers 130, and the storage devices 140 may be included in a controlled computing system environment that can be presented largely in terms of hardware components and software code executed to perform processes that achieve the results contemplated by the system of the present invention.

Figure 6:
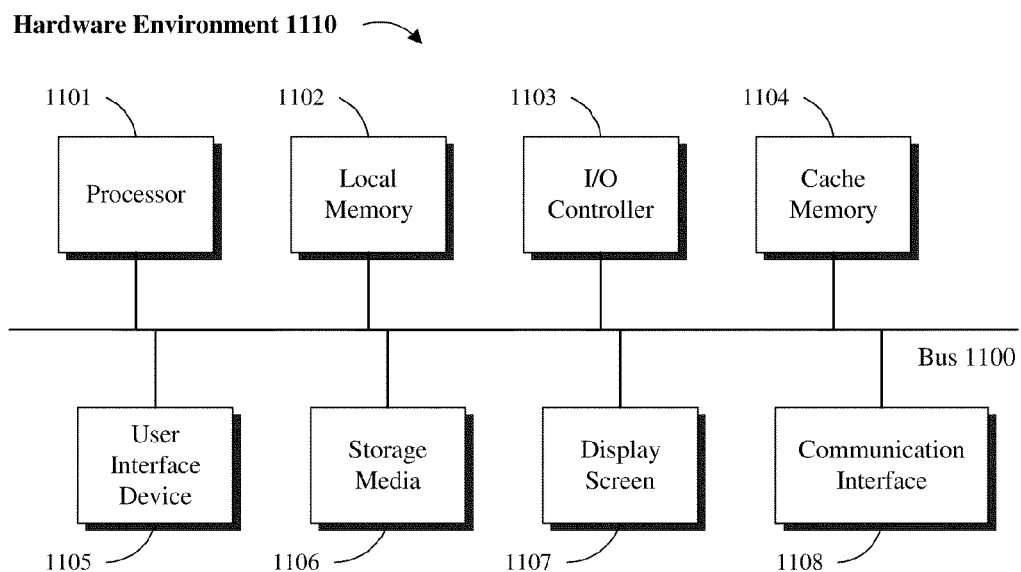
FIGS. 6 and 7 are block diagrams of hardware and software environments in which a system of the present invention may operate, in accordance with one or more embodiments.
Figure 7:
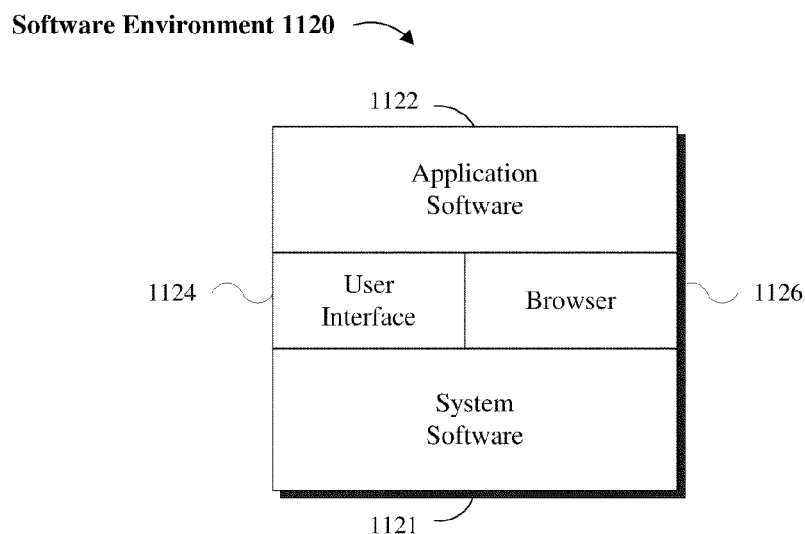

Referring to FIGS. 6 and 7, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, one or more of the applications 110, the servers 120, or the storage controllers 130 may be implemented as system software 1121 or application software 1122 executed on one or more hardware environments to manage power consumption in a data storage system.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 6, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computing system and server software is executed on a server system.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A method for managing power consumption in a data storage system, the method comprising:
   utilizing data that correlates power consumption in a storage device with length of a queue, in which input/output (I/O) requests are scheduled for service by the storage device, to determine a target queue length for said queue, wherein the target queue length meets a predetermined power consumption threshold, for each I/O request, wherein the predetermined power consumption threshold is associated with said storage device according to empirical data collected from I/O requests previously serviced by the storage device at various queue lengths;
   receiving a first I/O request identifying an I/O operation to be performed by the storage device;
   monitoring arrival rate of the I/O requests in relation to rate the arrived I/O requests are serviced by the storage device;
   delaying scheduling of the first I/O request for service, by storing the first I/O in a buffer until either a maximum buffer size is reached or a maximum latency associated with the first I/O request is reached, in response to determining that the arrival rate of I/O requests is less than the rate the arrived I/O requests are serviced by the storage device;
   forwarding the first I/O request along with zero or more other I/O requests in the buffer to a storage controller associated with the storage device,
   wherein the first I/O request and said other I/O requests are stored in said queue which is accessible by the storage controller, until the first I/O requests is scheduled for service by a target storage device;
   wherein the storage controller schedules the first I/O request and any other I/O requests in the queue for service using a scheduling mechanism, and
   adjusting the rate at which the first I/O request is forwarded to the storage controller according to the length of the queue and the target queue length such that the I/O requests in the queue are scheduled or re-scheduled to promote sequential disk access when the I/O requests in the queue are serviced by the storage device, so that the amount of power consumed per I/O request by servicing the I/O requests decreases as the length of the queue increases.

2. The method of claim 1, wherein the first I/O request is forwarded to the storage controller at a burst rate, in response to determining that the length of the queue has not reached the target queue length.

3. The method of claim 1, wherein the first I/O request is forwarded to the storage controller at a same rate that a second I/O request is forwarded to the storage device from the storage controller, in response to determining that the length of the queue has reached the target queue length.

4. The method of claim 1, further comprising determining whether the first I/O request is a read request or a write request.

5. The method of claim 4, wherein the delaying comprises holding the first I/O request in separate buffers depending on whether the first I/O request is a read request or a write request.

6. The method of claim 4, wherein the scheduling mechanism comprises separate queues for read requests and write requests.

7. The method of claim 4, wherein the read requests are synchronous.

8. The method of claim 4, wherein the write requests are asynchronous.

9. The method of claim 4, wherein the read requests are scheduled or serviced prior to the write requests.

10. The method of claim 1 wherein the maximum buffer size is determined based on the target queue length.

11. The method of claim 1 wherein the maximum buffer size is determined based on the target queue length.

12. The method of claim 1 wherein the maximum buffer size is determined based on the target queue length.

13. A system for managing power consumption in a data storage system, the system comprising:
   a server utilizing data that correlates power consumption in a storage device with length of a queue in which input/output (I/O) requests are scheduled for service by the storage device to determine a target queue length for said queue, wherein the target queue length meets a predetermined power consumption threshold per I/O request, wherein the predetermined power consumption threshold is associated with said storage device according to empirical data collected from I/O requests previously serviced by the storage device at various queue lengths;
   the server receiving a first I/O request identifying an I/O operation to be performed by the storage device; monitoring arrival rate of the I/O requests in relation to rate the arrived I/O requests are serviced by the storage device; delaying scheduling of the first I/O request for service, by storing the first I/O in buffer until a maximum buffer size is reached or a maximum latency associated with the first I/O request is reached, in response to determining that the arrival rate of I/O requests is less than the rate the arrived I/O requests are serviced by the storage device; and forwarding the first I/O request along with zero or more other I/O requests in the buffer to a storage controller associated with the storage device,
   wherein the first I/O request and said other I/O requests are stored in said queue which is accessible by the storage controller, until the first I/O requests is scheduled for service by a target storage device;
   wherein the storage controller schedules the first I/O request and any other I/O requests in the queue for service using a scheduling mechanism, and
   the server adjusting the rate at which the I/O requests are forwarded to the storage controller according to the length of the queue and the target queue length such that the I/O requests in the queue are scheduled or re-schedule to promote sequential disk access when the I/O requests are serviced by the storage device, so that the amount of power consumed by servicing the I/O requests decreases as the length of the queue increases, wherein the first I/O request is forwarded to the storage controller at a burst rate, in response to determining that the length of the queue has not reached the target queue length, wherein the first I/O request is forwarded to the storage controller at a same rate that a second I/O request is forwarded to the storage device from the storage controller, in response to determining that the length of the queue has reached the target queue length.

14. A computer program product comprising program code stored in a non-transitory data storage medium, wherein execution of the program code on a computer causes the computer to managing power consumption in a data storage system by:

utilizing data that correlates power consumption in a storage device with length of a queue, in which input/output (I/O) requests are scheduled for service by the storage device, to determine a target queue length for said queue, wherein the target queue length meets a predetermined power consumption threshold, for each I/O request, wherein the predetermined power consumption threshold is associated with said storage device according to empirical data collected from I/O requests previously serviced by the storage device at various queue lengths;

receiving a first I/O request identifying an I/O operation to be performed by the storage device;

monitoring arrival rate of the I/O requests in relation to rate the arrived I/O requests are serviced by the storage device;

delaying scheduling of the first I/O request for service, by storing the first I/O in a buffer until either a maximum buffer size is reached or a maximum latency associated with the first I/O request is reached, in response to determining that the arrival rate of I/O requests is less than the rate the arrived I/O requests are serviced by the storage device;

forwarding the first I/O request along with zero or more other I/O requests in the buffer to a storage controller associated with the storage device, wherein the first I/O request and said other I/O requests are stored in said queue which is accessible by the storage controller, until the first I/O requests is scheduled for service by a target storage device;

wherein the storage controller schedules the first I/O request and any other I/O requests in the queue for service using a scheduling mechanism, and wherein the storage device services the first I/O request according to the scheduling mechanism, and adjusting the rate at which the first I/O request is forwarded to the storage controller according to the length of the queue and the target queue length such that the I/O requests in the queue are scheduled or re-scheduled to promote sequential disk access when the I/O requests in the queue are serviced by the storage device, so that the amount of power consumed per I/O request by servicing the I/O requests decreases as the length of the queue increases.

15. The computer program product of claim 14, wherein the first I/O request is forwarded to the storage controller at a burst rate, in response to determining that the length of the queue has not reached the target queue length.

16. The computer program product of claim 14, wherein the first I/O request is forwarded to the storage controller at a same rate that a second I/O request is forwarded to the storage device from the storage controller, in response to determining that the length of the queue has reached the target queue length.

* * * * *